US012553174B2

(12) United States Patent
Giffey et al.

(10) Patent No.: US 12,553,174 B2
(45) Date of Patent: Feb. 17, 2026

(54) ROLLER APPARATUS

(71) Applicant: Curt G. Joa, Inc., Sheboygan Falls, WI (US)

(72) Inventors: Zachary J. Giffey, Plymouth, WI (US); Samuel A. Schneider, Elkhart Lake, WI (US)

(73) Assignee: CURT G. JOA, INC., Sheboygan Falls, WI (US)

( * ) Notice: Subject to any disclaimer, the term of this patent is extended or adjusted under 35 U.S.C. 154(b) by 245 days.

(21) Appl. No.: 18/320,903

(22) Filed: May 19, 2023

(65) Prior Publication Data

US 2023/0374720 A1 Nov. 23, 2023

(30) Foreign Application Priority Data

May 20, 2022 (EP) .................................... 22174697

(51) Int. Cl.
*D06F 67/02* (2006.01)
*B29C 33/02* (2006.01)
(Continued)

(52) U.S. Cl.
CPC ............ *D06F 67/02* (2013.01); *B29C 33/026* (2013.01); *B29C 35/02* (2013.01);
(Continued)

(58) Field of Classification Search
CPC ....... D06F 67/02; D06F 61/02; B29C 33/026; B29C 35/02; B29C 35/0266;
(Continued)

(56) References Cited

U.S. PATENT DOCUMENTS 1,514,288 A * 11/1924 Hynes ..................... D06F 67/02
219/471
3,182,587 A * 5/1965 Woodhall ................ B21B 29/00
241/37
(Continued)

FOREIGN PATENT DOCUMENTS

CN 212495939 U 2/2021
DE 202016102636 U1 7/2016
(Continued)

OTHER PUBLICATIONS

European Search Report as issued in corresponding EP Application No. 22174697.7, mailed Nov. 10, 2022.

*Primary Examiner* — Jeffrey M Wollschlager
(74) *Attorney, Agent, or Firm* — Quarles & Brady, LLP

(57) ABSTRACT

A roller apparatus for treating at least one web passing through the apparatus, the apparatus comprising a pattern roller in the form of a first cylindrical body mounted for rotation around an elongate axis (A) of the first cylindrical body, and an anvil roller in the form of a second cylindrical body mounted for rotation around an elongate axis (B) of the second cylindrical body.
The pattern and anvil rollers are located adjacent each other to define a nip between outer cylindrical surfaces of the first and second cylindrical bodies. The first and second cylindrical bodies are configured to rotate, in use, in opposite directions to each other so as to draw the at least one web through the nip defined between the outer cylindrical surfaces of the first and second cylindrical bodies.
The outer cylindrical surface of the first cylindrical body defines a raised profile section having a predetermined shape that extends both widthwise and circumferentially of the first cylindrical body.
The pattern roller incorporates an elongate cartridge heater extending widthwise along the elongate axis (A) of the first
(Continued)

cylindrical body. The cartridge heater defines at least two outer zones located widthwise on opposite sides of a centrally located middle zone. The cartridge heater is configured to generate, in use, more heat in the outer zones than in the middle zone.

10 Claims, 13 Drawing Sheets

(51) Int. Cl.
  *B29C 35/02* (2006.01)
  *B29C 59/00* (2006.01)
  *B29C 59/04* (2006.01)
  *D06F 61/02* (2006.01)
(52) U.S. Cl.
  CPC ........ *B29C 35/0266* (2013.01); *B29C 59/002* (2013.01); *B29C 59/04* (2013.01); *D06F 61/02* (2013.01); *B29C 2035/0211* (2013.01)
(58) Field of Classification Search
  CPC ................. B29C 59/002; B29C 59/04; B29C 2035/0211; B29C 43/46
  See application file for complete search history.

(56) References Cited

U.S. PATENT DOCUMENTS

| | | | |
|---|---|---|---|
| 3,786,661 A * | 1/1974 | McKee | B21B 37/60 72/14.4 |
| 4,023,391 A * | 5/1977 | Kamii | B21B 37/32 72/200 |
| 4,088,519 A | 5/1978 | Johnson | |
| 4,145,236 A | 3/1979 | Neumayer et al. | |
| 4,512,169 A * | 4/1985 | Miura | B21B 37/18 72/10.4 |
| 4,572,753 A | 2/1986 | Bach | |
| 5,069,122 A | 12/1991 | Kaufmann et al. | |
| 5,605,026 A | 2/1997 | Schott et al. | |
| 5,643,678 A | 7/1997 | Boswell | |
| 5,775,055 A | 7/1998 | Giacomelli et al. | |
| 6,652,689 B2 | 11/2003 | Kubik | |
| 8,317,078 B1 | 11/2012 | Strotmann et al. | |
| 8,464,623 B2 * | 6/2013 | Peshkar | B26D 7/10 83/72 |
| 9,149,980 B2 | 10/2015 | Cham et al. | |
| 9,517,852 B2 | 12/2016 | Beauvy et al. | |
| 11,214,012 B2 | 1/2022 | Ogaya et al. | |
| 2002/0148269 A1 * | 10/2002 | Ruck | H01M 8/0263 72/197 |
| 2005/0257700 A1 * | 11/2005 | Lutz | G03H 1/268 101/6 |
| 2009/0095403 A1 | 4/2009 | Otsubo et al. | |
| 2009/0105677 A1 | 4/2009 | Otsubo et al. | |
| 2009/0165517 A1 * | 7/2009 | Pavlicevic | B21B 1/26 72/221 |
| 2010/0168705 A1 | 7/2010 | Stabelfeldt et al. | |
| 2011/0067474 A1 * | 3/2011 | Tazoe | B21C 47/00 72/200 |
| 2011/0120622 A1 | 5/2011 | Moeglich | |
| 2012/0086145 A1 | 4/2012 | Nakamura et al. | |
| 2012/0280019 A1 | 11/2012 | Van Reatherford et al. | |
| 2012/0283681 A1 | 11/2012 | Lohoff | |
| 2013/0323523 A1 * | 12/2013 | Oishi | B21B 1/26 72/200 |
| 2017/0165728 A1 * | 6/2017 | Xavier | B21B 1/227 |
| 2020/0316846 A1 * | 10/2020 | Nakajima | B29C 59/022 |
| 2020/0361158 A1 | 11/2020 | Sugiura et al. | |

FOREIGN PATENT DOCUMENTS

| | | |
|---|---|---|
| DE | 102016108228 B4 | 11/2017 |
| JP | 2001219482 A1 | 8/2001 |
| WO | 2020163694 A1 | 8/2020 |
| WO | 2022071604 A1 | 4/2022 |

* cited by examiner

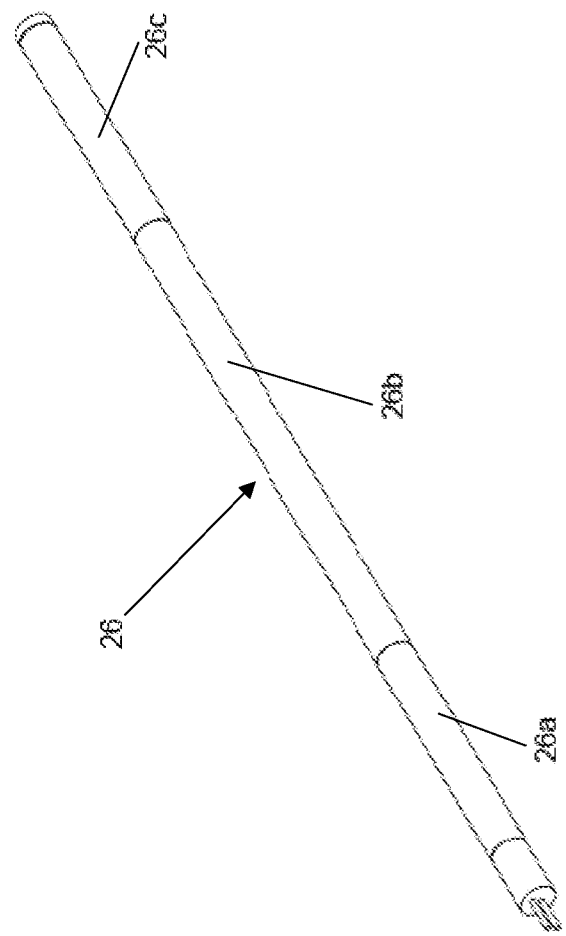
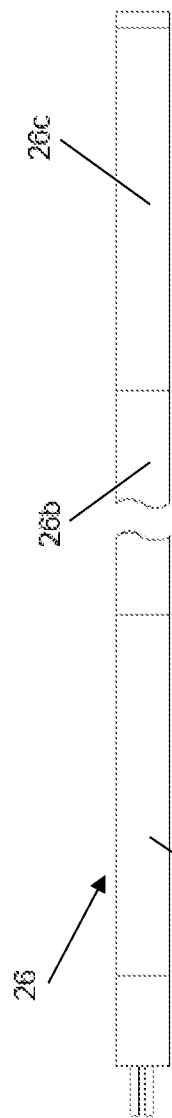
Figure 4a
Figure 4b

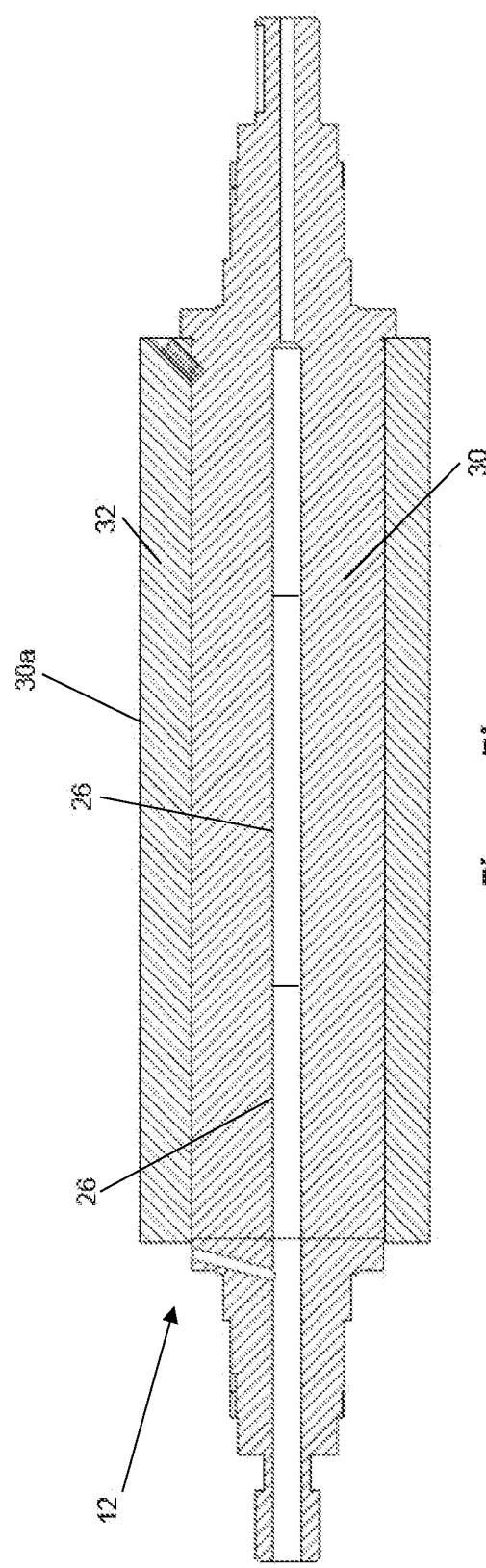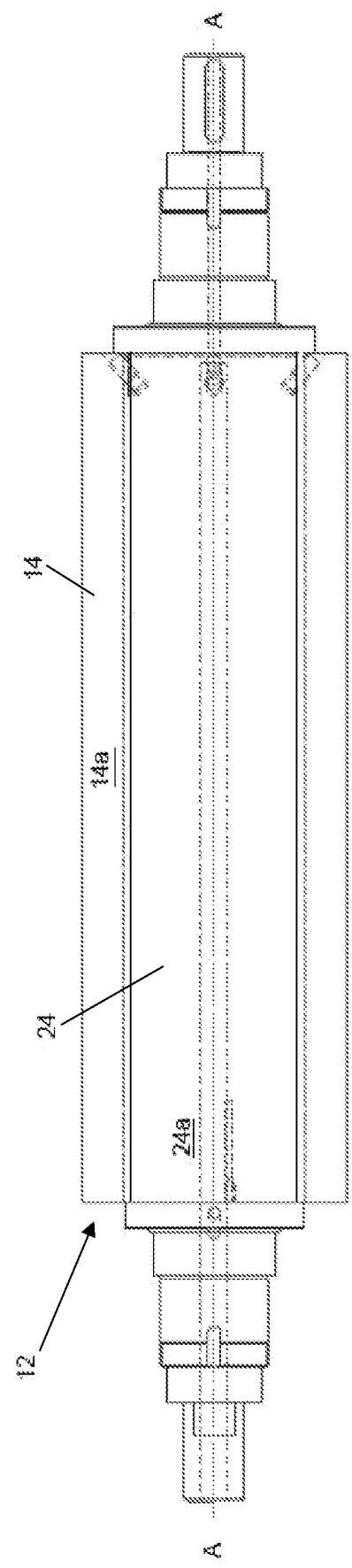
Figure 5b
Figure 5c

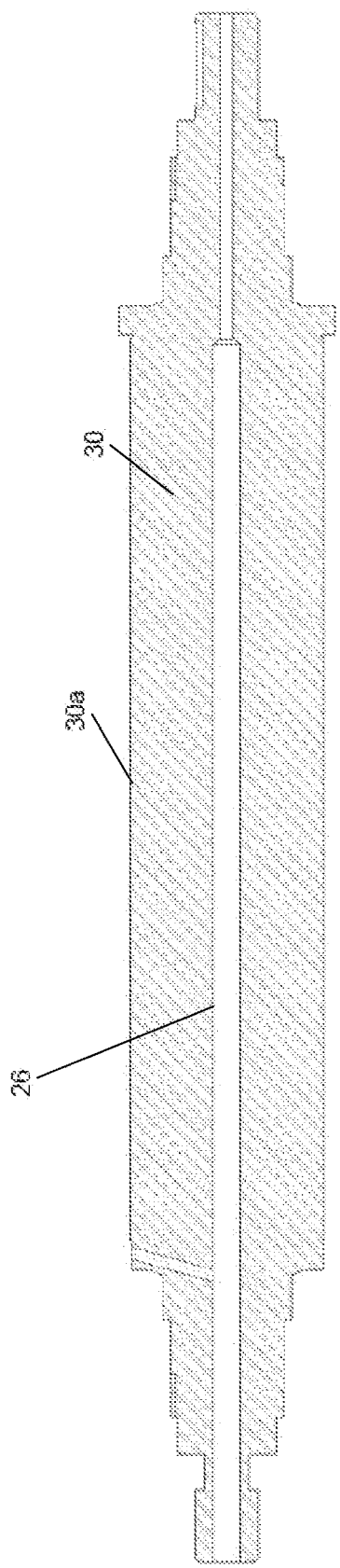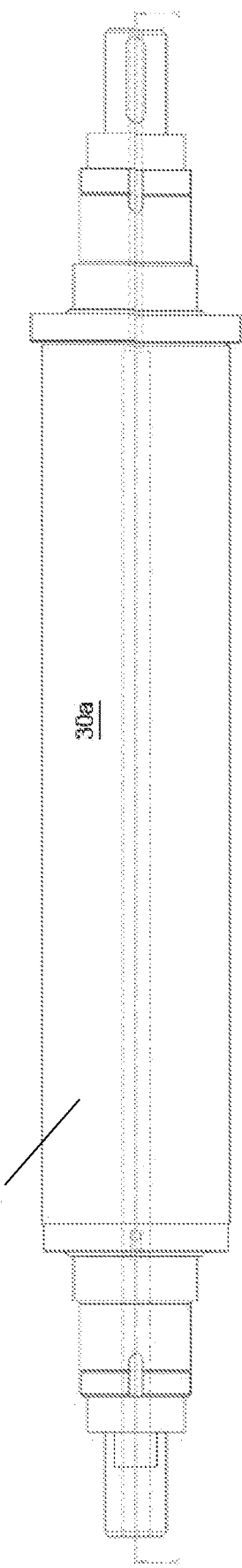
Figure 6b
Figure 6c

ROLLER APPARATUS

CROSS REFERENCE TO RELATED APPLICATION

This application claims the benefit of European Application No. 22174697.7, filed May 20, 2022, the disclosure of which is hereby incorporated by reference in its entirety for all purposes.

The invention relates to a roller apparatus for treating at least one web passing through the apparatus, and a method of treating a web. More specifically, the invention relates to a roller apparatus and associated method for treating an elasticized web in order to reduce the elasticity of the web.

Wearable absorbent articles including, for example, adult incontinence products, enuresis pants, training pants and diapers typically incorporate elasticized sections across the front and/or back of the article in order to keep the article snug against a wearer during use. Some articles use a multiplicity of elastic strands within front and back waist panels to provide the required elasticity. Others use elastomeric webs, which may comprise elastic nonwoven webs such as, for example, meltblown elastomeric fibrous webs, coextruded elastomeric films, elastic scrim, or elastomeric films, which may be provided alone or attached to one or more woven or nonwoven layers. Certain feminine hygiene products also include elasticized regions manufactured from the aforementioned elastomeric materials.

Such absorbent articles include an absorbent member formed from wood pulp fluff, superabsorbent polymers and/or other absorbent materials to absorb urine or other bodily fluids. The absorbent member is typically located in the crotch region but may extend into the front and back portions of the article. Where there is overlap between the absorbent member and the elasticized regions of the article, tension created by elastic strands, or elastomeric webs, incorporated in the waist panels can cause bunching up of the absorbent member.

Such bunching is undesirable because it affects the fit of the absorbent article. An absorbent article that is bunched in the front or back regions is less likely to fit snugly against a wearer during use. As a result it is more likely to be prone to leakages. An absorbent article that is bunched also has a greater bulk and so is more likely to be visible through outer clothing. This is particularly embarrassing for those wearing adult incontinence products and enuresis pants.

In order to reduce bunching across the front and back regions of an absorbent article, the elasticity of the webs used to form the front and back waist portions are often deadened. Deadening the elasticity of the webs in regions that overlap the absorbent member, removes tension that might otherwise cause bunching of the absorbent member and thereby reduces the bulk of the absorbent article.

According to an aspect of the invention there is a provided a roller apparatus for treating at least one web passing through the apparatus, the apparatus comprising a pattern roller in the form of a first cylindrical body mounted for rotation around an elongate axis of the first cylindrical body, and an anvil roller in the form of a second cylindrical body mounted for rotation around an elongate axis of the second cylindrical body, the pattern and anvil rollers being located adjacent each other to define a nip between outer cylindrical surfaces of the first and second cylindrical bodies, and the first and second cylindrical bodies being configured to rotate, in use, in opposite directions to each other so as to draw the at least one web through the nip defined between the outer cylindrical surfaces of the first and second cylindrical bodies;

wherein the outer cylindrical surface of the first cylindrical body defines a raised profile section having a predetermine shape that extends both widthwise and circumferentially of the first cylindrical body; and the pattern roller incorporates an elongate cartridge heater extending widthwise of the first cylindrical body along or near the elongate axis of the first cylindrical body, the cartridge heater defining at least two outer zones located widthwise on opposite sides of a centrally located middle zone and the cartridge heater being configured to generate, in use, more heat in the outer zones than in the middle zone.

The roller apparatus provides a mechanism for reducing the elasticity in an elasticized web for use in the manufacture, for example, of absorbent articles. The nip defined between the pattern and anvil rollers applies pressure to an elasticized web drawn between the rollers with the raised profile section defined by the circumferential surface of the first cylindrical body increasing the pressure applied to discrete regions of the web.

The application of increased pressure to discrete regions of the web, in combination with the application of heat as a result of the cartridge heater incorporated in the pattern roller, reduces the elasticity of the discrete regions of the web.

The provision of a cartridge heater extending widthwise of the first cylindrical body along or near the elongate axis of the first cylindrical body and defining at least two outer zones located widthwise on opposite sides of a middle zone, where the cartridge heater is configured to generate more heat in the outer zones than in the middle zones, is particularly advantageous because it results in a more consistent temperature along the width of the first cylindrical body.

Differing temperatures along the width of a cylindrical body will otherwise cause different regions of the cylindrical body to expand more than others. In the roller apparatus set out above, any inconsistencies in temperature along the width of the first cylindrical body would result in inconsistencies in the size of the nip along the lengths of the first and second cylindrical bodies.

Maintaining a consistent temperature along the width of the first cylindrical body helps to ensure the size of the nip remains consistent along the width of the first cylindrical body, and the amount of heat applied to the web passing through the nip is also consistent along the width of the roller.

The anvil roller of the roller apparatus may also incorporate an elongate cartridge heater extending widthwise of the second cylindrical body along or near the elongate axis of the second cylindrical body, the cartridge heater defining at least two outer zones located widthwise on opposite sides of a centrally located middle zone and the cartridge heater being configured to generate, in use, more heat in the outer zones than in the middle zone.

As with the pattern roller, the cartridge heater configuration results in a more consistent temperature along the width of the second cylindrical body.

By heating both rollers, the roller apparatus is able to heat an elasticized web drawn through the nip from both sides and thereby improves the performance of the roller apparatus in reducing the elasticity of the elasticized web across the regions of the web subject to greater pressure as a result of the raised profile section defined by the outer circumferential surface of the first cylindrical body of the pattern roller.

In embodiments of the invention, the pattern roller and, optionally, the anvil roller may include a single cartridge heated extending along the elongate axis of the respective cylindrical body. This ensures a uniform a distribution of heat throughout the cylindrical body.

In other embodiments, the pattern roller and, optionally, the anvil roller may incorporate a plurality of elongate cartridge heaters extending widthwise of the respective cylindrical body, the elongate heaters being arranged in an equidistantly spaced configuration around the elongate axis of the cylindrical body so as to extend generally parallel to the elongate axis widthwise of the cylindrical body. This arrangement similarly ensures a uniform distribution of heat throughout the cylindrical body, particularly when a cylindrical body having a relatively large diameter is used.

Preferably, the cartridge heaters of the pattern and anvil rollers are selectively controllable, in use, to control temperatures of the outer cylindrical surfaces of the first and second cylindrical bodies independently. By doing so, it is possible to achieve different operating temperatures at the outer cylindrical surfaces of the first and second cylindrical bodies in order to accommodate different nonwoven layers used on opposite sides of the web.

This is advantageous when an elastomeric film is coupled to one or more nonwoven layers requiring differing amounts of heat energy to penetrate the outer layers and heat the elastomeric film in order to produce the required reduction in elasticity of the elastomeric film.

By controlling the operating temperatures of the pattern and anvil rollers independently of each other it is possible, for example, to heat the anvil roller to a higher temperature than the pattern roller when an elasticized web is drawn though the nip including a relatively thicker nonwoven layer on the side of the web that will be brought into contact with the anvil roller when compared with a thinner nonwoven layer on the side of the web that will be brought into contact with the pattern roller.

In particularly preferred embodiments the or each cartridge heater is configured to generate no heat in its middle zone.

The applicant has unexpectedly found that by creating a so-called "cold zone" at a central location widthwise of the or each cartridge heater, it is able to achieve a more consistent flow of heat energy from the cartridge heater through the cylindrical body and, as a result, a more consistent temperature along the width of the outer cylindrical surface.

Preferably, the heat generated in the outer zones of the or each cartridge heater is controllable, in use, to maintain a consistent temperature along the width of the across the width of the outer cylindrical surface of the respective cylindrical body.

For example, in particularly preferred embodiments of the invention, a controller might control the operation of the outer zones of the cartridge heaters in response to measurements received from temperature sensors incorporated in one or both of the cylindrical bodies to measure the temperature at or near the outer cylindrical surface.

Controlling the outer zones of the or each cartridge heater to produce more or less heat allows fluctuations in the operating temperature of the outer cylindrical surface of the respective cylindrical body to be rectified to ensure a consistent temperature along the width of the outer cylindrical surface.

In embodiments of the invention, the raised profile section defines a smooth treatment surface protruding equidistantly relative to the remainder of the outer cylindrical surface of the first cylindrical body.

The provision of a smooth treatment surface ensures a consistent application of pressure, in combination with heat from the pattern roller and, optionally, the anvil roller in order to reduce the elasticity of an elasticized web fed between the nip of the first and second cylindrical bodies.

The use of a continuous treatment surface, as opposed to a patterned surface, is rendered possible by the creation of a consistent temperature along the width of the outer cylindrical surface of the pattern roller and, optionally, the anvil roller. This allows greater control of the application of pressure and heat to discrete regions of an elasticized web in order to carefully control the extent to which the elasticity is reduced. The pressure and heat might be controlled, for example, in order to reduce the elasticity by a certain percentage or might be controlled, for example, to deaden the elasticity depending on the performance required from the web in an eventual product.

In order to further tune the amount of pressure applied to a web via the nip between the first and second cylindrical bodies, the pattern and anvil rollers may be movable relative to each other in order to adjust the nip defined between the outer cylindrical surfaces of the first and second cylindrical bodies.

This allows adjustment of the nip, for example, depending on the thickness of the at least one web and/or in order to adjust the amount of pressure applied to discrete regions of the web by means of the raised profile section in order to adjust the extent to which the elasticity of the web is reduced.

According to a second aspect of the invention there is provided a method of treating a web comprising the steps of:

feeding a web into a roller apparatus for treating the web, the apparatus comprising a pattern roller in the form of a first cylindrical body mounted for rotation around an elongate axis of the first cylindrical body, and an anvil roller in the form of a second cylindrical body mounted for rotation around an elongate axis of the second cylindrical body, the pattern and anvil rollers being located adjacent each other to define a nip between outer cylindrical surfaces of the first and second cylindrical bodies;

rotating the pattern roller in a first direction and rotating the anvil roller in a second, opposite direction to draw the web through the nip;

applying pressure to discrete regions of the web by means of a raised profile section defined by the outer cylindrical surface of the first cylindrical body, the raised profile section having a predetermined shape that extends both widthwise and circumferentially of the first cylinder body; and operating a cartridge heater incorporated in the pattern roller to heat the first cylindrical body and heat an outer surface of the web in contact with the outer cylindrical surface of the first cylindrical body as the web is drawn through the nip, the cartridge heater extending widthwise of the first cylindrical body along or near the elongate axis of the first cylindrical body and defining at least two outer zones located widthwise on opposite sides of a centrally located middle zone where the cartridge heater generates more heat in the outer zones than in the middle zone.

Other preferred features of the invention are set out in the accompanying dependent claims.

Preferred embodiments of the invention will now be described, by way of non-limiting examples, with reference to the accompanying drawings in which:

FIGS. 4a and 4b shows a cartridge heater of the roller apparatus of FIG. 1;

FIGS. 5a-5c shows perspective, side and cross-sectional views of a pattern roller of the roller apparatus of FIG. 1;

FIGS. 6a-6c shows perspective, side and cross-sectional views of a bonder roller of the pattern roller of FIGS. 5a-5c;

Figure 1:
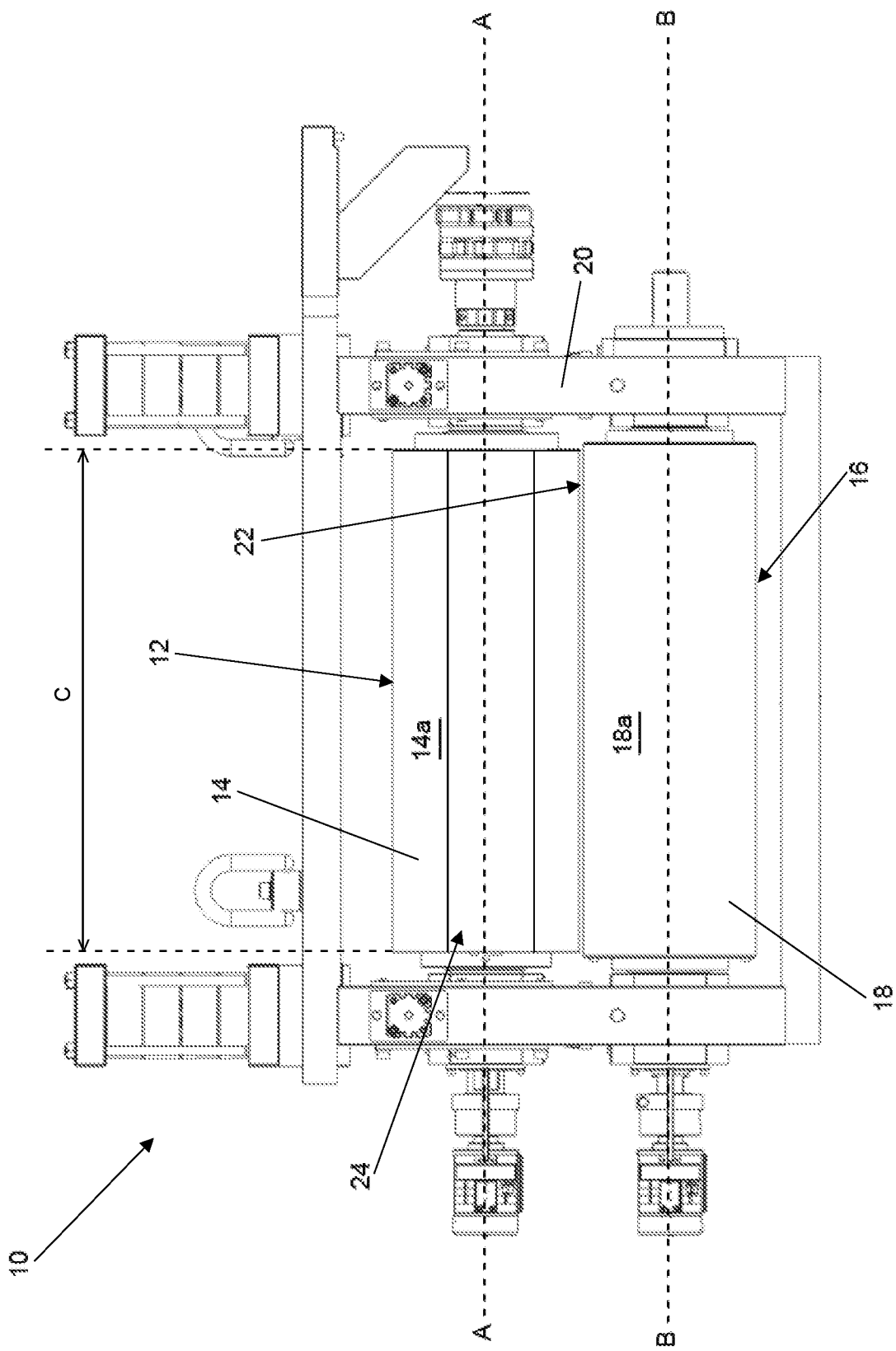
FIG. 1 shows a side elevational view of a roller apparatus according to an embodiment of the invention.
Figure 2:
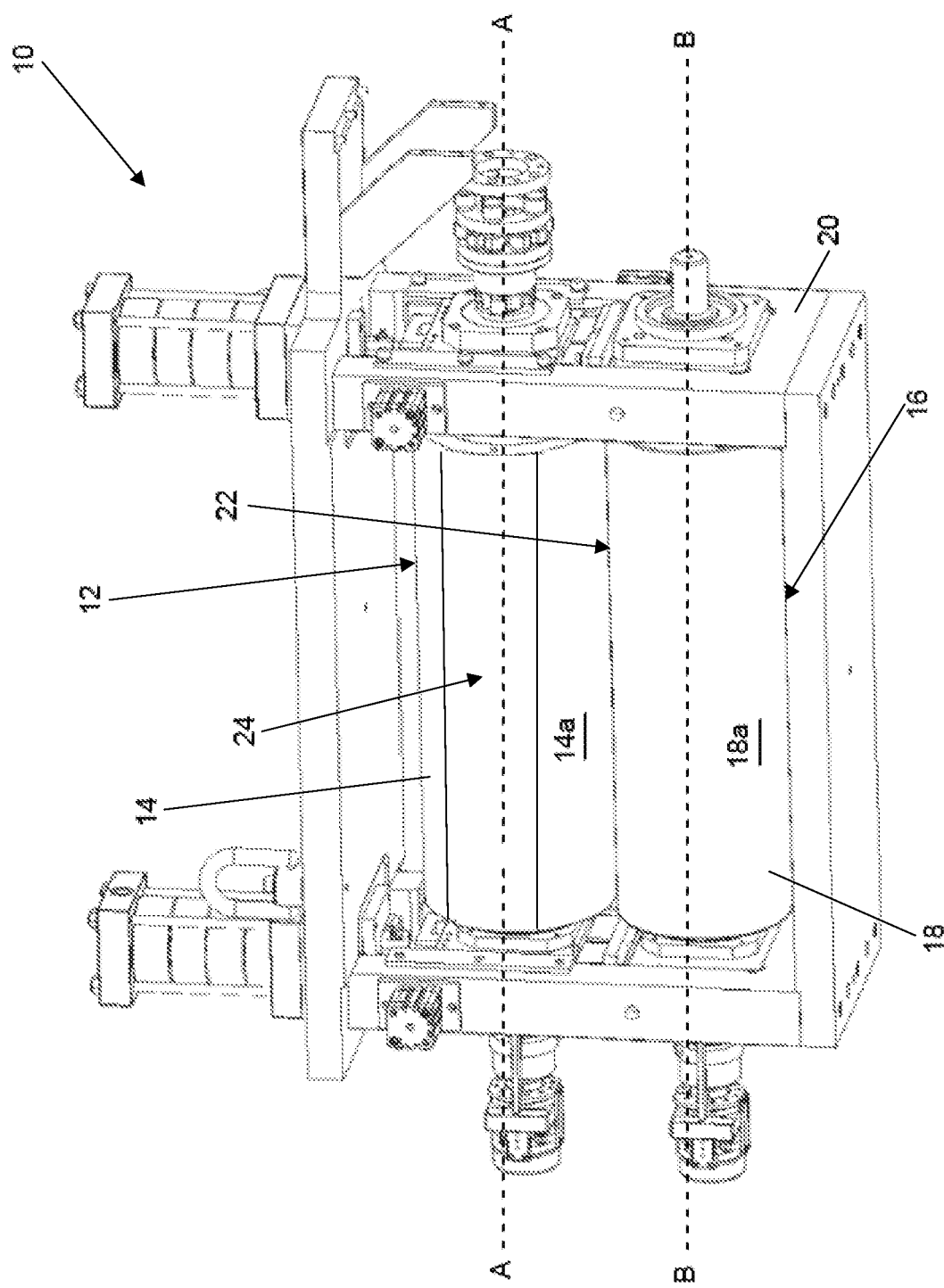
FIG. 2 shows a perspective view of the roller apparatus of FIG. 1.

A roller apparatus 10 according to an embodiment of the invention is shown in FIGS. 1 and 2.

The roller apparatus 10 includes a pattern roller 12 in the form of a first cylindrical body 14 mounted for rotation around an elongate axis A of the first cylindrical body 14 and an anvil roller 16 in the form of a second cylindrical body 18 mounted for rotation around an elongate axis B of the second cylindrical body 18.

The pattern and anvil rollers 12,16 are mounted in a frame 20 so as to be located adjacent each other to define a nip 22 between outer cylindrical surfaces 14a,18a of the first and second cylindrical bodies 14,18. The relative positions of the pattern and anvil rollers 12,16 are adjustable by sliding one or both of the rollers 12,16 within the frame in order to order to move the outer cylindrical surfaces 14a,18a of the first and second cylindrical bodies 14,18 closer together or further apart. This facilitates adjustment of the size of the nip 22 between the outer cylindrical surfaces 14a,18a.

Motors (not shown) are coupled to the pattern and anvil rollers 12,16 to drive rotation of the rollers 12,16 in opposite directions to each other.

The cylindrical surface 14a of the first cylindrical body 14 defines a raised profile section 24 having a predefined shape that extends both widthwise and circumferentially of the first cylindrical body 14.

It will be appreciated in the context of this invention, the "width" of each of the first and second cylindrical bodies 14,18 is the elongate dimension identified as C in FIG. 1 and aligned with the elongate axis of the cylindrical body 14,18.

Figure 3:
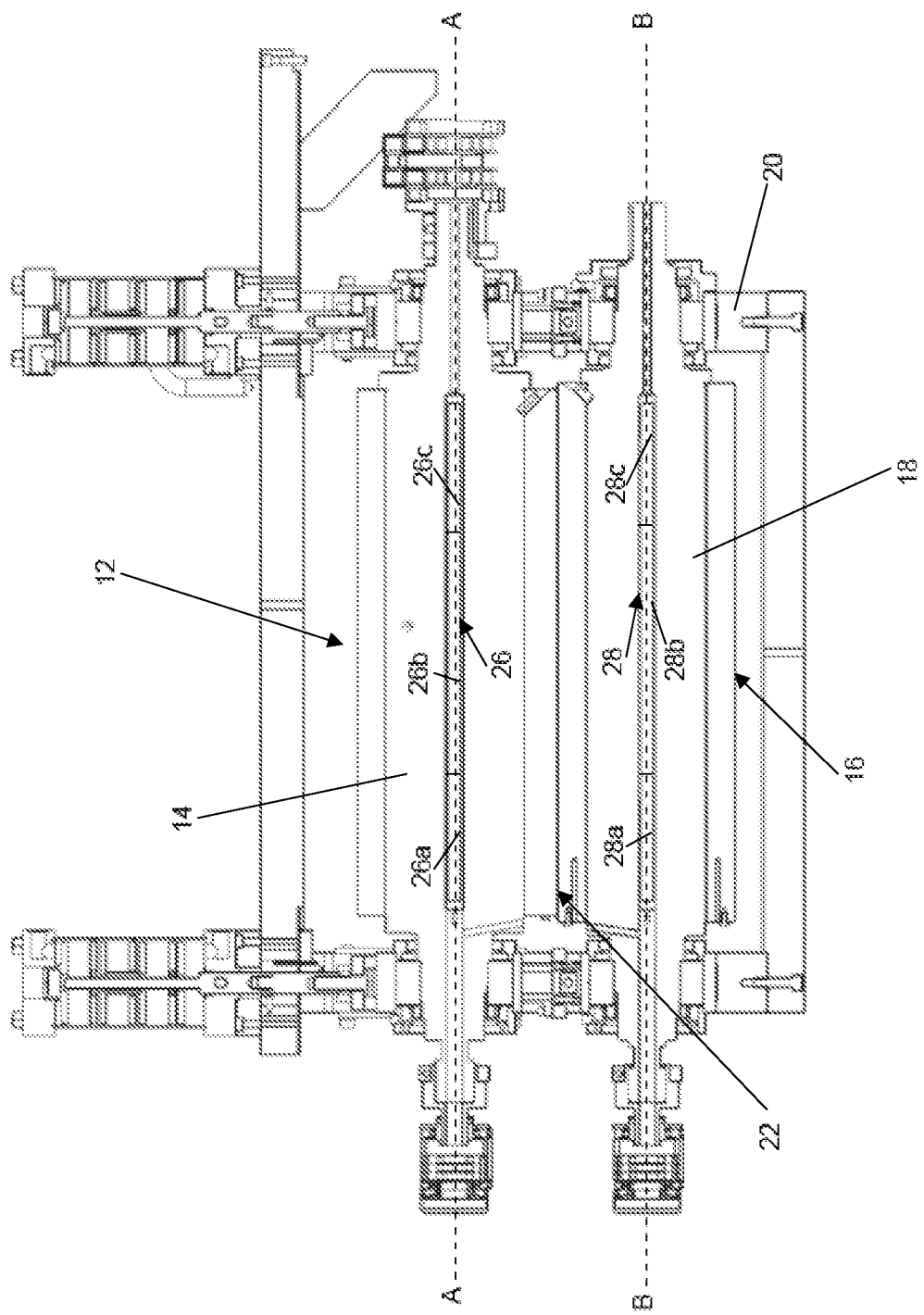
FIG. 3 shows a cross-sectional view of the roller apparatus of FIG. 1.

Referring to FIG. 3, it can be seen that the pattern roller 12 includes an elongate cartridge heater 26 extending widthwise along the elongate axis A of the first cylindrical body 14. As shown in FIGS. 3, 4a and 4b, the cartridge heater 26 defines at least two outer zones 26a,26c located widthwise on opposite sides of a centrally located middle zone 26b.

In the embodiment shown in FIG. 1, the anvil roller 16 also includes an elongate cartridge heater 18 (FIG. 3) extending widthwise along the elongate axis B of the second cylindrical body 28. As in the pattern roller 12, the cartridge heater of the anvil roller 16 defines at least two outer zones 28a,28c located widthwise on opposite sides of a centrally located middle zone 28b.

In other embodiments, one or both of the pattern and anvil rollers 16,18 include a plurality of elongate cartridge heaters 26,28 extending widthwise of the respective cylindrical body 14,18. In such embodiments, the elongate heaters 16,18 are arranged in an equidistantly spaced configuration around the elongate axis A,B of the cylindrical body 14,18 so as to extend generally parallel to the elongate axis A,B widthwise of the cylindrical body 14,18. This arrangement is particularly useful when cylindrical bodies 14,18 having relatively large diameters are used in order to ensure a uniform distribution of heat throughout the cylindrical body 14,18.

The cartridge heaters 26,28 are connected to a controller (not shown), which controls operation of the cartridge heaters 26,28. The zones 26a-26c are configured to be controlled independently so that one zone can produce more or less heat than one or more of the other zones.

In the embodiment shown in FIG. 1, the outer zones 26a,26c and 28a,28c of the two cartridge heaters 26,28 are configured to generate heat whilst the middle zones 26b and 28b of the cartridge heaters 26,28 are configured to generate no heat and create a so-called "cold zone".

Referring to the cartridge heater 26 it can be seen that the middle or cold zone 26b is twice the size in terms of width than each of the outer zones 26a,26c. This arrangement provides a particularly beneficial heating arrangement in that it allows a consistent flow of heat from the heated outer zones 26a,26c through the body of the cylindrical body 14 and thus a consistent temperature at the outer cylindrical surface 14a. This is a surprising result because heat energy will be lost to the surrounding air and frame 20 via the ends of the cylindrical body 14 and so it might be expected that a sufficient amount of heat would not flow into the central section of the cylindrical body 14 around the middle or cold zone 26b of the cartridge heater 26 and that heating from the middle zone 26b would also be required. The applicant has, however, found that not to be the case.

In the embodiment shown in FIG. 1, which is intended for use in the manufacture of an exemplary adult pant unit, a cartridge heater 26 having a width in the range of 550 mm-650 mm and diameter in the range of 15 mm-25 mm is incorporated in the pattern roller 12, which has a width of 550 mm-650 mm and diameter of 200 mm-250 mm. The outer zones 26a,26c each have a width of in the range of 15-35% of the overall width of the pattern roller 12 with the middle zone 26b having a width in the range of 30-70% of the overall width of the pattern roller 12. End portions of the cartridge heater 26 in this arrangement are unheated.

Different widths of cartridge heaters 26,28 may be used in other embodiments depending on the size of the respective cylindrical bodies 14,18. Typically, cartridge heaters 26,28 having a width in the range of 40 mm-950 mm and a diameter in the range of 15 mm-55 mm are used.

It will be appreciated in the context of this invention, the "width" of the cartridge heater 26,28 is the elongate dimension aligned with the elongate axis of the respective cylindrical body 14,18. The cartridge heater 28 incorporated in the anvil roller 16 has the same dimensions whilst the anvil roller 16 has a width in the range of 550 mm-650 mm and a diameter in the range of 200 mm-250 mm.

Different sized cylindrical bodies 14,18 for the pattern and anvil rollers 12,16 are used for use in the manufacture of different absorbent products. The sizes required for adult-sized products will of course be significantly larger than those required for infant-sized products or feminine hygiene products. Typically, the cylindrical bodies 14,18 may have a width in the range of 50 mm-1 m with a diameter in the range of 150 mm-510 mm. Smaller dimensions in these ranges are suitable for smaller products, such as baby products and feminine hygiene products. Larger dimensions in these ranges are applicable to adult pant products where the pattern roller 12 is utilized in a multi-up fashion with multiple raised pattern regions spaced around the circumference of the pattern roller 12.

In the embodiment shown in FIG. 1, the power of each cartridge heater 26,28 is 5500 W. Cartridge heaters having different power might be used in other embodiments depending on the sizes of the cylindrical bodies 14,18, the material from which the cylindrical bodies 14,18 are made and/or the heating characteristics required from each of the rollers 12,16. Typically, the power may range from 100 W-10,000 W.

The pattern and anvil rollers 12,16 include temperature sensors located at or near the outer cylindrical surfaces 14a,18a of the cylindrical bodies 14,18. This allows the controller to effectively monitor the temperatures of the outer cylindrical surfaces 14a,18a and control the outer zones 26a,26c and 28a,28c of the two cartridge heaters 26,28 in order to maintain a consistent temperature along the width of the outer cylindrical surfaces 14a,18a of the cylindrical bodies 14,18.

Figure 5A:
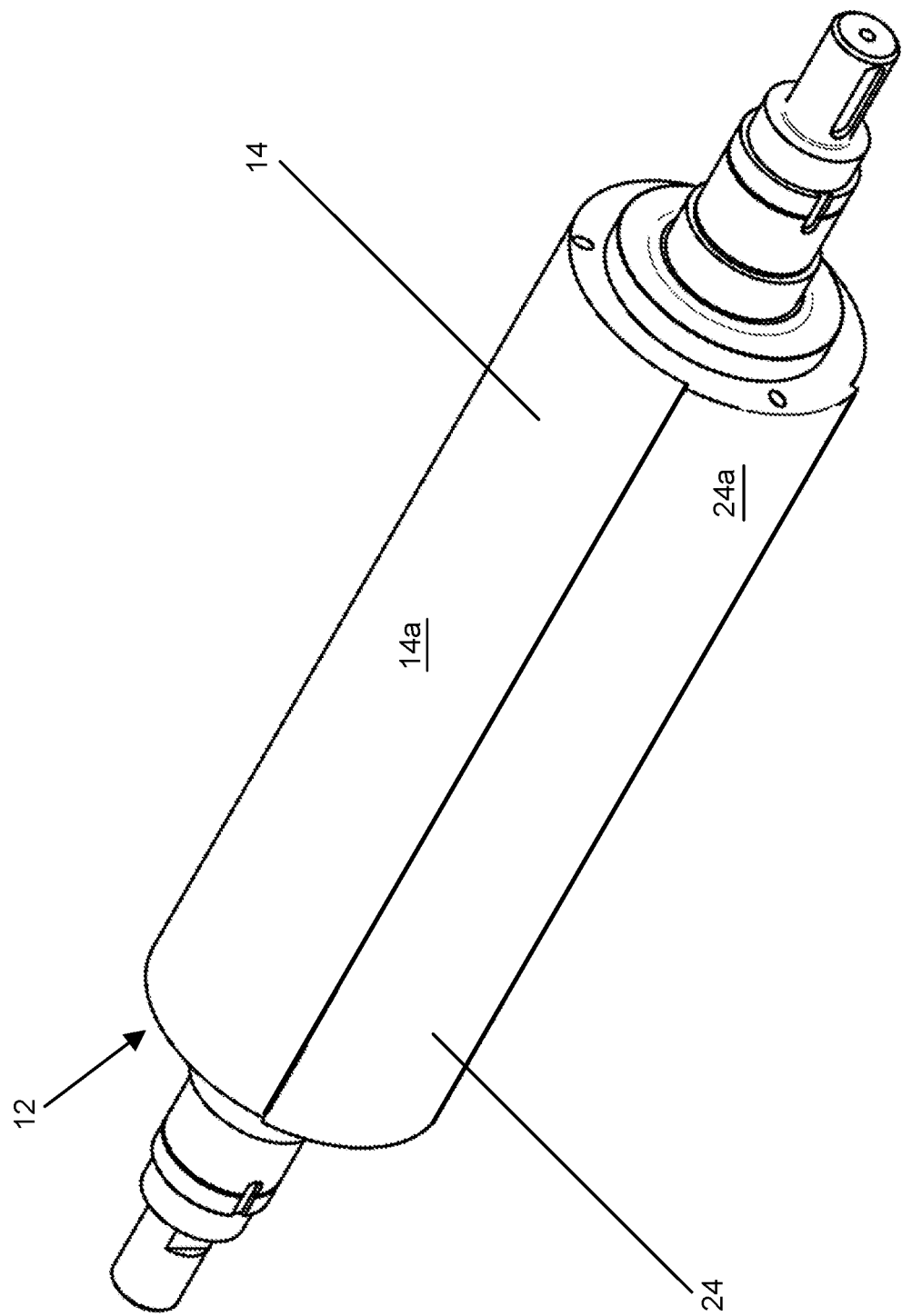
Figure 6A:
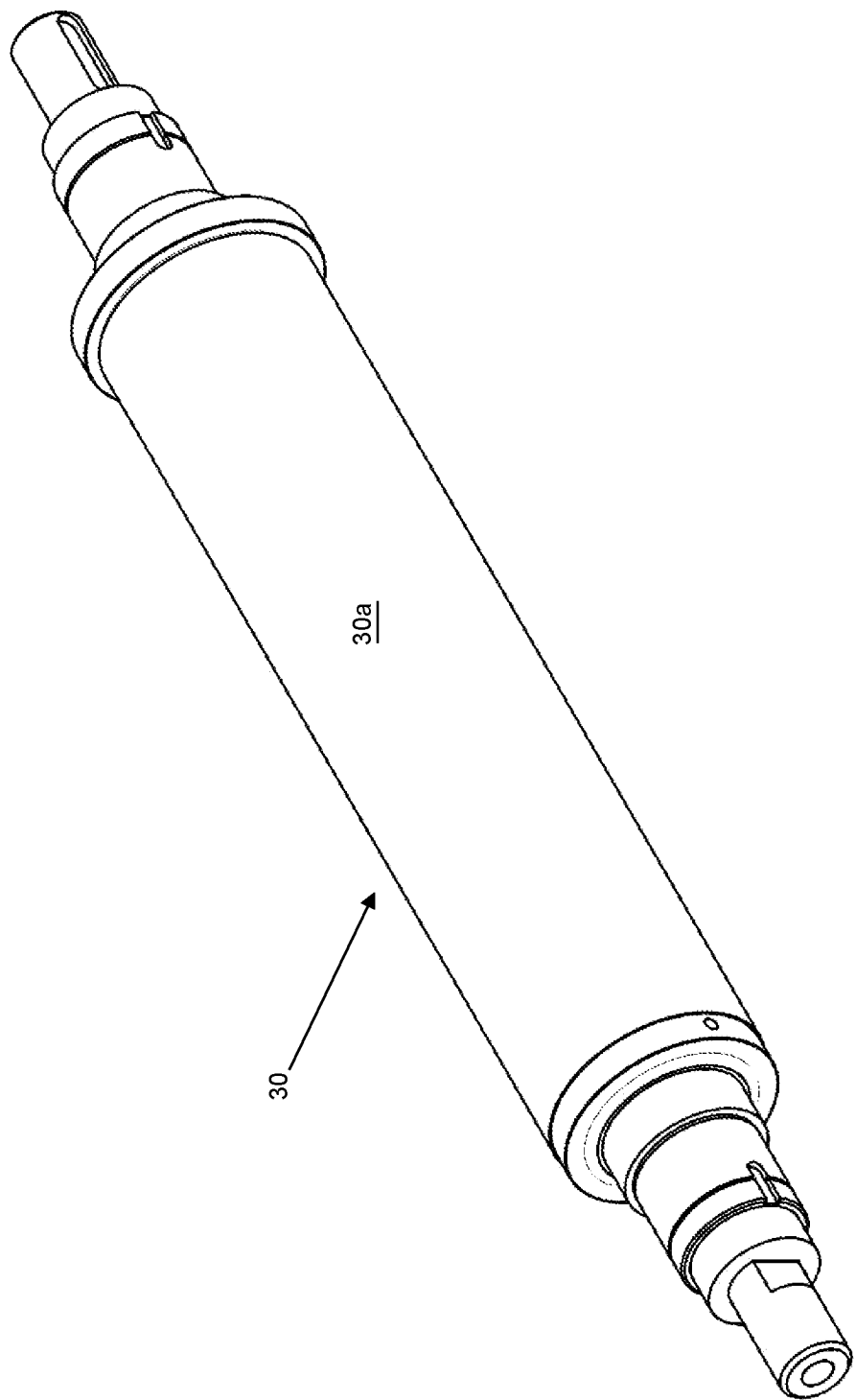

The pattern roller 12 is shown in more detail in FIGS. 5a-5c. The pattern roller 12 includes a bonder roller 30 incorporating the cartridge heater 26 extending widthwise along the elongate axis A of the bonder roller 30. A hollow, cylindrical pattern shell 32 is slid over the outer cylindrical surface 30a of the bonder roller 30. The bonder roller and pattern shell 32 in combination defining the first cylindrical body 14 of the pattern roller 12 and the outer cylindrical surface of the pattern shell 32 defining the outer cylindrical surface 14a.

Figure 7A:
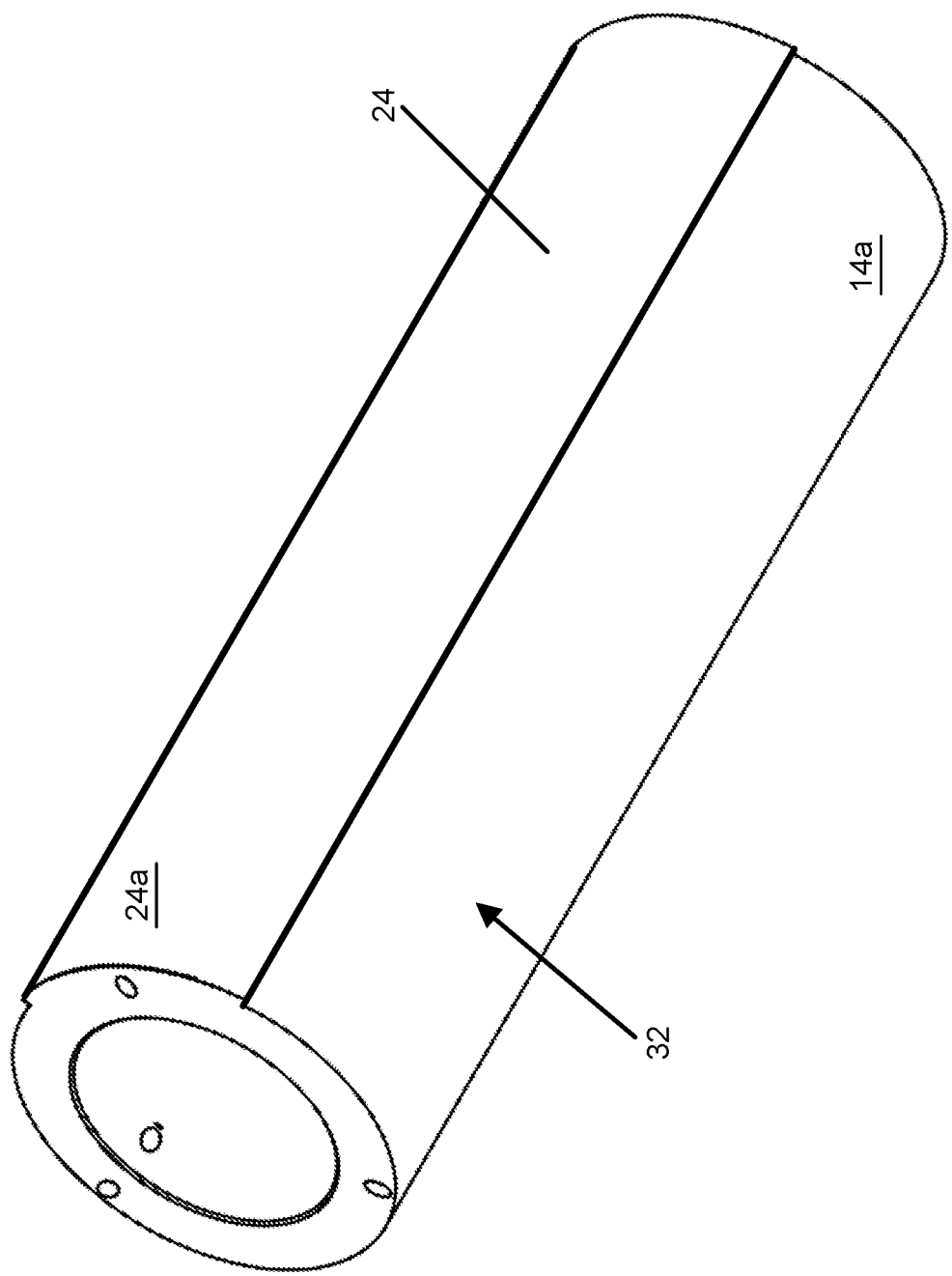
FIGS. 7a-7c shows perspective, side and cross-sectional views of a pattern sleeve of the pattern roller of FIGS. 5a-5c.
Figure 7B:
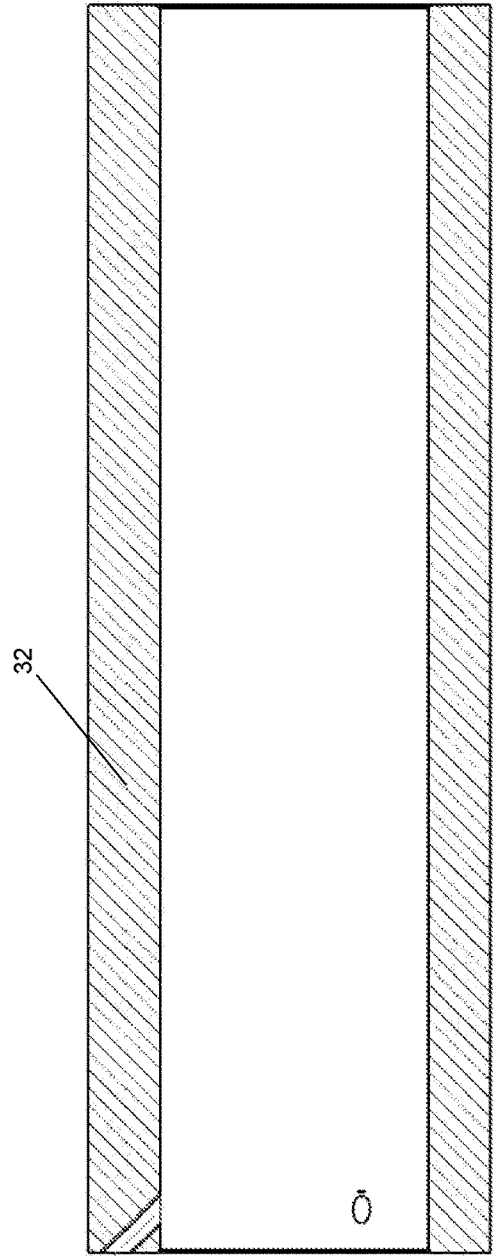
Figure 7C:
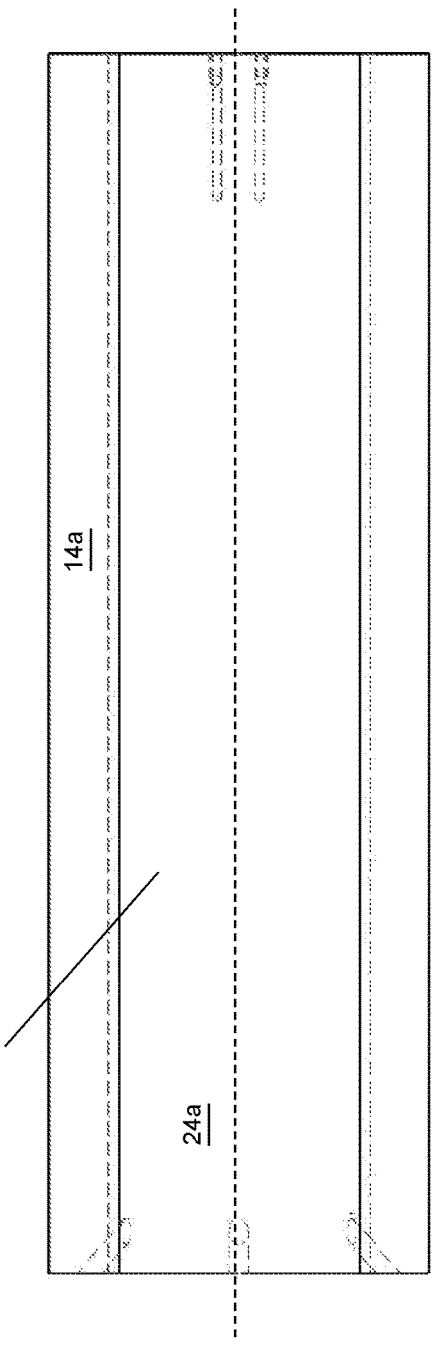

The raised profile section 24 defined by the outer cylindrical surface 14a of the first cylindrical body 14 is shown in FIGS. 5c and 7c. The raised profile section 24 has a predefined shape and protrudes equidistantly relative to the remainder of the outer cylindrical surface of the first cylindrical body 14.

As shown in FIGS. 5a and 7a, the raised profile section 24 defines a smooth treatment surface 24a. The shape of the raised profile section 24 is determined by the eventual use of the treated web. It will be appreciated, therefore, that the shape and size of the raised profile section 24, and thus the shape and size of the smooth treatment surface 24a could differ from that shown in FIGS. 5a and 7a. Furthermore, the first cylindrical body 14 may include two or more raised profile sections 24 spaced apart from one another around the outer circumference of the first cylindrical body 14. Such multi-up configurations of the pattern roll may be used for smaller sized products, including baby diaper, light incontinence, and feminine hygiene products, that are produced at a relatively small product pitch. The first cylindrical body 14 may also include multiple raised profile sections 24 spaced apart in the width direction of the first cylindrical body 14 to create discontinuous deadened regions in the cross-machine direction.

Figure 8A:
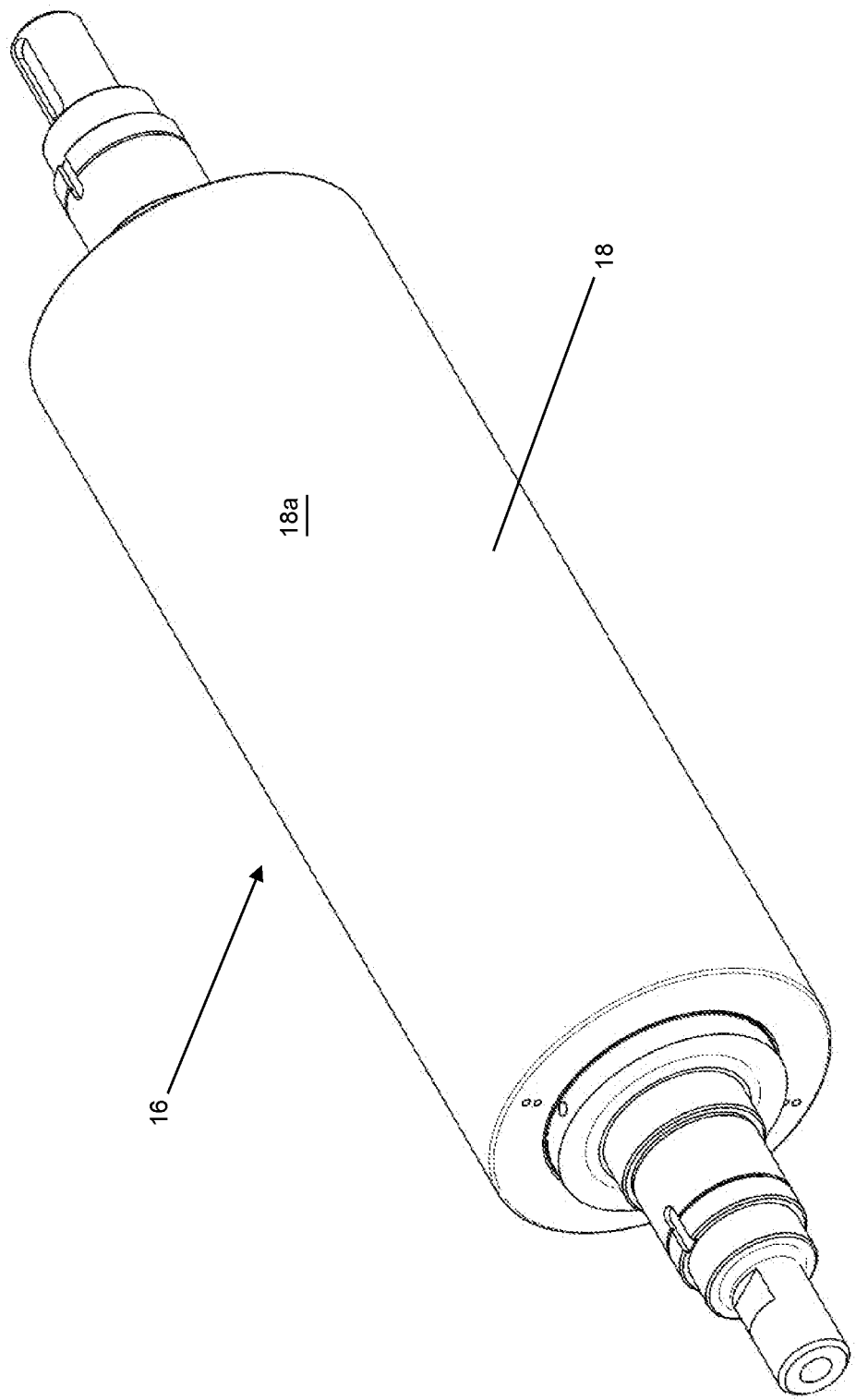
FIGS. 8a and 8b show perspective and cross-sectional views of an anvil roller of the roller apparatus of FIG. 1.
Figure 8B:
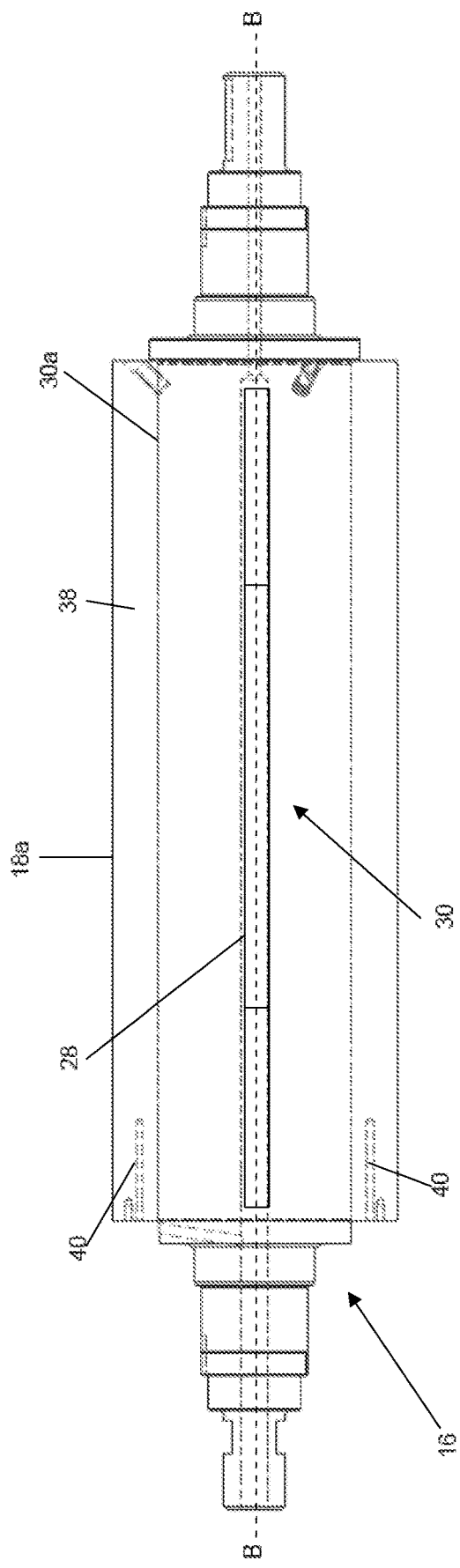
Figure 9:
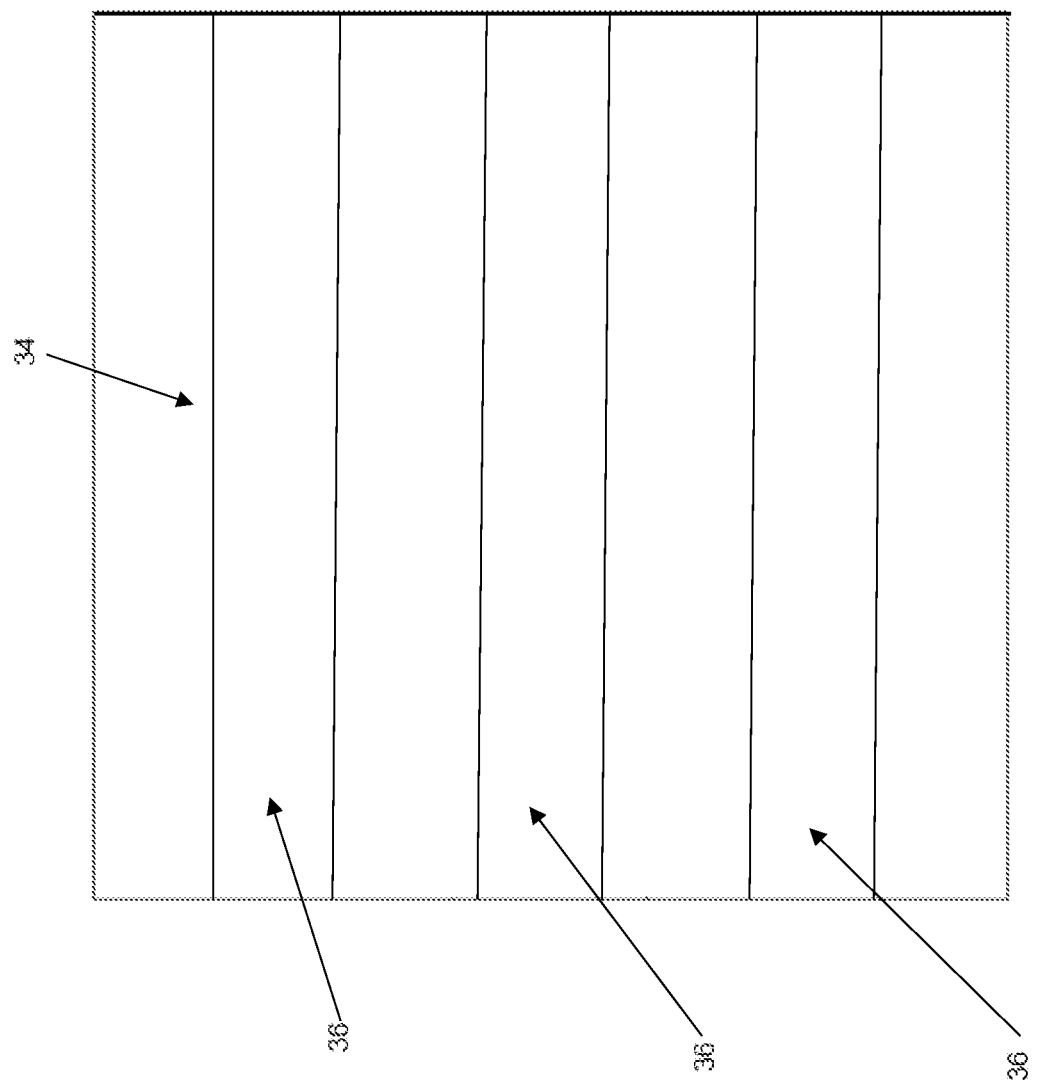
FIG. 9 shows a section of elasticized web after it has been treated by the roller apparatus of FIG. 1.

The anvil roller 16 is shown in more detail in FIGS. 8a and 8b. As with the pattern roller 12, the anvil roller 16 includes a bonder roller 30 incorporating the cartridge heater 28 extending widthwise along the elongate axis B of the bonder roller 30. A hollow cylindrical anvil shell 38 is slid over the cylindrical surface 30a of the bonder roller 30. The bonder roller 30 and anvil shell 38 in combination defining the second cylindrical body 18 of the anvil roller 16 and the outer cylindrical surface of the anvil shell 38 defining the outer cylindrical surface 18a.

Temperature sensors (not shown) are received in apertures 40 (FIG. 8b) formed in the anvil shell 38 to measure the temperature at or near the outer cylindrical surface 18a of the second cylindrical body 18 of the anvil roller 16.

Temperature sensors are similarly received in corresponding apertures (not shown) formed in the pattern shell 32 of the pattern roller 12 to measure the temperature at or near the outer cylindrical surface 14a of the first cylindrical body of the pattern roller 12.

The roller apparatus 10 may be used to treat an elasticized web 34 in order to reduce the elasticity in discrete regions of the web 34 and operation of the roller apparatus 10 will now be described with reference to the treatment of an elasticized web 34 in the form of an elastomeric web sandwiched between nonwoven outer layers.

In use, the pattern and anvil rollers 12,16 are driven by means of motors to rotate in opposite directions to each other so that when a web 34 is fed into the nip 22 of the roller apparatus 10 it is drawn through the nip 22 by the rotation of the rollers 12,16.

The cartridge heaters 26,28 of the pattern and anvil rollers 12,16 are operated to heat the two outer zones 26a,26c and 28a,28c in order to heat the outer cylindrical surfaces 14a,18a and thereby heat the web 34 as it is drawn through the nip 22.

As well as applying heat, the outer cylindrical surfaces 14a,18a of the pattern and anvil rollers 12,16 apply pressure to the web 34. This pressure is increased over discrete regions of the web 34 that are brought into contact with the smooth treatment surface 24a of the raised profile section 24 defined by the outer cylindrical surface 14a of the pattern roller 12 as it is brought into contact with the web 34.

The increased pressure applied to the discrete regions of the web 34, in combination with the heat applied by the outer cylindrical surfaces 14a,18a of the pattern and anvil rollers acts to reduce the elasticity of the web 34 across the discrete regions of the web 34.

During operation, the temperatures of the outer cylindrical surfaces 14a,18a of the pattern and anvil rollers are measured by means of the sensors mounted in the pattern shell 32 and anvil shell 38. Those temperatures are used to control the operation of the cartridge heaters 26,28 in order to maintain a consistent temperature along the width of the outer cylindrical surfaces 14a,18 of both the pattern and anvil rollers 12,16. As outlined above, the controller provided to control the operation of the cartridge heaters 26,28 maintains the temperature of the outer cylindrical surfaces 14a,18a by increasing or decreasing, as required, the heat generated in the outer zones 26a,26c and 28a,28c of the cartridge heaters 26,28. No heat is generated in the middle zones 26b,28b of the cartridge heaters 26,28.

It is envisaged that in other, less preferred embodiments, one or both of the cartridge heaters 26,28 might be operated to generate heat in the middle zones 26b,28b depending on the nature of the materials used to form the web 34. It remains the case in all circumstances, however, that the outer zones 26a,26c and 28a,28c would generate more heat than is generated in the middle zones 26b,26c in order to maintain consistent temperatures along the lengths of the outer cylindrical surfaces 14a,18a of the pattern and anvil rollers 12,16.

An inconsistent temperature along the width of one of both of the outer cylindrical surfaces 14a,18a of the pattern and anvil rollers 12,16, will cause those regions of the cylindrical body at a higher temperature to expand more than those at a lower temperature. This would result in an inconsistency in the size of the nip 22 between the outer cylindrical surfaces 14a,18a of the pattern and anvil rollers 12,16 and thus an uneven application of pressure to the web 34 as it is drawn through the nip 22.

This is undesirable because it could produce an inconsistent reduction in the elasticity of the web 34 in the discrete regions treated by the treatment surface 24a of the raised profile section 24 of the pattern roller 12.

The ability to maintain a consistent temperature along the lengths of the outer cylindrical surfaces 14a,18a allows the use of a smooth treatment surface 24a on the raised profile section 24. This in turn allows greater uniformity in the pressure applied to the discrete regions of the web 34 that are brought into contact with the treatment surface 24. The consistent application of heat along the lengths of the outer cylindrical surfaces 14a,18a of the pattern and anvil rollers 12,16, together with the uniform application of pressure by means of the smooth treatment surface 24a, greatly improves the performance of the roller apparatus 10 in the reduction of the elasticity in the discrete regions of the web 34.

The extent to which the elasticity of a given web 34 is reduced may be tailored by adjusting the size of the nip 22 between the outer circumferential surfaces 14a,18a of the pattern and anvil rollers 12,16 by adjusting the relative positions of the rollers 12,16 in the frame 20.

In the embodiment shown in FIG. 1, the size of the nip 22 is in the range of 0 mm to 0.254 mm. The raised profile section 24 has a radial height in the range of 1 mm to 10 mm when compared with the non-raised section of the outer circumferential surface 14a of the pattern roller 12. The size of the nip 22 and/or the radial height of the raised profile section 24 might vary in other embodiments depending on the thickness of the individual material layers of elasticized web 34 being fed into the nip 22.

The extent of reduction of elasticity might also be tailored by adjusting the temperatures of the outer circumferential surfaces 14a,18a of the pattern and anvil rollers 12,16 by adjusting the heat generated in the outer zones 26a,26c and 28a,28c of the cartridge heaters 26,28. The cartridge heaters 26,28 might, for example, be controlled to heat the pattern and anvil rollers 12,16 so that the outer circumferential surfaces 14a,18a operate at different temperatures.

In the embodiment shown in FIG. 1, the operating temperatures of the outer circumferential surfaces 14a,18a of the pattern and anvil rollers are in the range of 50° C. to 180° C., and more preferably in the range of 80° C. to 100° C. In other embodiments, the operating temperatures of the circumferential surfaces 14a,18a may vary based on the material properties of the elasticized web 34.

In particularly preferred embodiments, an elasticized web 34 is treated by being drawn through the roller apparatus 10 in order to reduce the elasticity of discrete regions of the web 34 to 25% or more of the elasticity exhibited by the elasticized web 34 prior to treatment. In alternate embodiments, the elasticity of the elasticized web may be reduced to less than 25% of the elasticity exhibited by the elasticized web 34 prior to treatment or eliminated completely.

This might be particularly advantageous when the nonwoven outer layer of a web 34 that is drawn through the nip 22 in contact with the anvil roller 16 is thicker or otherwise more dense than the nonwoven layer of the web 34 that is drawn though the nip 22 in contact with the pattern roller 12. In those circumstances, the operating temperature of the outer circumferential surface 18a of the anvil roller 16 might be greater than the operating temperature of the outer circumferential surface 14a of the pattern roller 12.

As a result, the roller apparatus 10 can be used to treat a web 34 so as to create discrete regions in an elasticized web 34 in which the elasticity is reduced to varying degrees or eliminated entirely.

The nip 22 might also be adjusted to allow webs 34 differing in thickness to be fed into and drawn through the nip 22.

The operating temperatures of the outer circumferential surfaces 14a,18a of the pattern and anvil rollers might also be adjusted in circumstances where one or both of the nonwoven outer layers of the web 34 is formed from a heat sensitive material.

In order to allow for variations in the outer surfaces of the web 34, the speeds of rotation of the pattern and anvil rollers 12,16 might be varied relative to each other. This might be desirable, for example, when the friction generated between a nonwoven outer layer of the web 34 in contact with the anvil roller 16 is greater than the friction generated between a nonwoven outer layer on the opposite surface of the web 34 in contact with the pattern roller 12. In those circumstances, the speed of rotation of the anvil roller 16 might be increased in order to ensure the web 34 is drawn through the nip 22 with minimum distortion.

As a continuous length of the web 34 is drawn through the nip 22 defined between the outer circumferential surfaces 14a,18a of the pattern and anvil rollers 12,16, the smooth treatment surface 24a of the raised profile section 24 defined by the outer circumferential surface 14a of the pattern roller 12 will be repeatably brought into contact with equidistantly spaced regions of the web 34. As a result, the web 34 exiting the nip 22 will present a series of equidistantly spaced regions in which the elasticity of the web 34 is reduced, each of those regions corresponding in shape and size to the shape and size to the treatment surface 24a of the raised profile section 24.

The distance between adjacent regions of reduced elasticity will be determined by the circumferential distance of the non-raised portion of the outer circumferential surface 14a between the edges of the raised profile section 24 on the pattern roller 12.

When the web is to be used to form the back and front waist sections of adult incontinence pants, the raised profile section 24 might be shaped to correspond in shape and size to the absorbent member intended for use in the pants so that when the absorbent member is aligned with the front and back waist sections, it aligns with sections in which the elasticity of the web is reduced in order to prevent bunching of the absorbent member.

The circumferential size of the outer circumferential surface of the pattern roller 12 might be varied through the use of different pattern shells 32. A pattern shell 32 having a larger circumferential size might be desirable, for example, to accommodate a larger treatment surface 24a and allow sufficient distance of the non-raised portion of the outer circumferential surface 14a between the edges of the raised profile section 24. The discrete regions of reduced elasticity of the treated web 34 might not otherwise be sufficiently spaced from each other. The rotational speed of the pattern roller 12 may also be varied using mechanical elements such as cams or linkages to control spacing between the discrete regions of reduced elasticity of the treated web.

In terms of the structure of the web 34, when an elastomeric film is coupled to one or more nonwoven outer layers, the nonwoven layers are preferably bonded to the elastomeric film so as to prevent slippage between the different layers. The elastomeric film and outer nonwoven layer(s) might, for example, be bonded together via adhesive or be fed through a mechanical, thermal, or ultrasonic bonding unit prior to being fed into the roller apparatus 10 so as to create an all over pattern of bonds between the outer nonwoven layers and the elastomeric film.

The invention claimed is:

1. A roller apparatus for treating at least one elasticized web for producing a wearable absorbent product passing through the apparatus, the apparatus comprising a pattern roller in the form of a first cylindrical body mounted for rotation around an elongate axis of the first cylindrical body, and an anvil roller in the form of a second cylindrical body mounted for rotation around an elongate axis of the second cylindrical body, the pattern and anvil rollers being located adjacent each other to define a nip between outer cylindrical surfaces of the first and second cylindrical bodies, and the first and second cylindrical bodies being configured to rotate, in use, in opposite directions to each other so as to draw the at least one web through the nip defined between the outer cylindrical surfaces of the first and second cylindrical bodies;

wherein the outer cylindrical surface of the first cylindrical body defines a raised profile section having a predetermined shape selected to deaden an elasticity in a selected portion of the at least one elasticized web by the application of pressure and heat, the raised profile section extending both widthwise and circumferentially of the first cylindrical body; and the pattern roller incorporates an elongate cartridge heater extending widthwise of the first cylindrical body along or near the elongate axis of the first cylindrical body, the cartridge heater defining at least two outer zones located widthwise on opposite sides of a centrally located middle zone and the cartridge heater being configured to generate, in use, more heat in the outer zones than in the middle zone, the amount of heat applied by the cartridge heater in the middle and outer zones being controlled to maintain the size of the nip consistent across the width of the first and second cylindrical bodies, wherein a pressure applied to the elasticized web is consistent across the web as it passes through the apparatus.

2. The roller apparatus according to claim 1 wherein the anvil roller incorporates an elongate cartridge heater extending widthwise of the second cylindrical body along or near the elongate axis of the second cylindrical body, the cartridge heater defining at least two outer zones located widthwise on opposite sides of a centrally located middle zone and the cartridge heater being configured to generate, in use, more heat in the outer zones than in the middle zone.

3. The roller apparatus according to claim 1 wherein the pattern roller incorporates a plurality of elongate cartridge heaters extending widthwise of the first cylindrical body, the elongate cartridge heaters being arranged in an equidistantly spaced configuration around the elongate axis of the first cylindrical body so as to extend generally parallel to the elongate axis widthwise of the first cylindrical body.

4. The roller apparatus according to claim 1 wherein the anvil roller incorporates a plurality of elongate cartridge heaters extending widthwise of the second cylindrical body, the elongate cartridge heaters being arranged in an equidistantly spaced configuration around the elongate axis of the second cylindrical body so as to extend generally parallel to the elongate axis widthwise of the second cylindrical body.

5. The roller apparatus according to claim 2 wherein the cartridge heaters of the pattern and anvil rollers are selectively controllable, in use, to control temperatures of the outer cylindrical surfaces of the first and second cylindrical bodies independently.

6. The roller apparatus according to claim 1 wherein the cartridge heater is configured to generate no heat in its middle zone.

7. The roller apparatus according to claim 1 wherein the heat generated in the outer zones of the cartridge heater is controllable, in use, to maintain a consistent temperature along the width of the outer cylindrical surface of the cylindrical body.

8. The roller apparatus according to claim 1 wherein the raised profile section defines a smooth treatment surface protruding equidistantly relative to the remainder of the outer cylindrical surface of the first cylindrical body.

9. The roller apparatus according to claim 1 wherein the pattern and anvil rollers are movable relative to each other in order to adjust the nip defined between the outer cylindrical surfaces of the first and second cylindrical bodies.

10. The roller apparatus according to claim 1 wherein the rotation of each of the first and second cylindrical bodies is selectively controllable, in use, to control speeds of rotation of the first and second cylindrical bodies independently.

* * * * *